P. B. DONAHOO.
PIVOT LIGHT.
APPLICATION FILED JULY 13, 1909.

967,621.

Patented Aug. 16, 1910.

WITNESSES:
J. D. McLaughlin
H. C. Schroeder

INVENTOR
PETER B. DONAHOO
BY
ATTORNEY

UNITED STATES PATENT OFFICE.

PETER B. DONAHOO, OF OAKLAND, CALIFORNIA, ASSIGNOR TO ALFRED H. LENT, OF OAKLAND, CALIFORNIA.

PIVOT-LIGHT.

967,621.  Specification of Letters Patent.  Patented Aug. 16, 1910.

Application filed July 13, 1909.  Serial No. 507,326.

*To all whom it may concern:*

Be it known that I, PETER B. DONAHOO, citizen of the United States, residing at Oakland, in the county of Alameda and State of California, have invented certain new and useful Improvements in Pivot-Lights, of which the following is a specification, reference being had therein to the accompanying drawing.

This invention relates to headlight operating means and the principal object of the invention is to provide a connection between the turning gear of a vehicle and said headlight so that the rays from the headlight will always be projected in the direction the vehicle is traveling.

In carrying out the objects of the invention generally stated above, it will, of course, be understood that the essential features thereof are necessarily susceptible of changes in details and structural arrangements, but a preferred and practical embodiment thereof is shown in the accompanying drawings, wherein—

Figure 1:
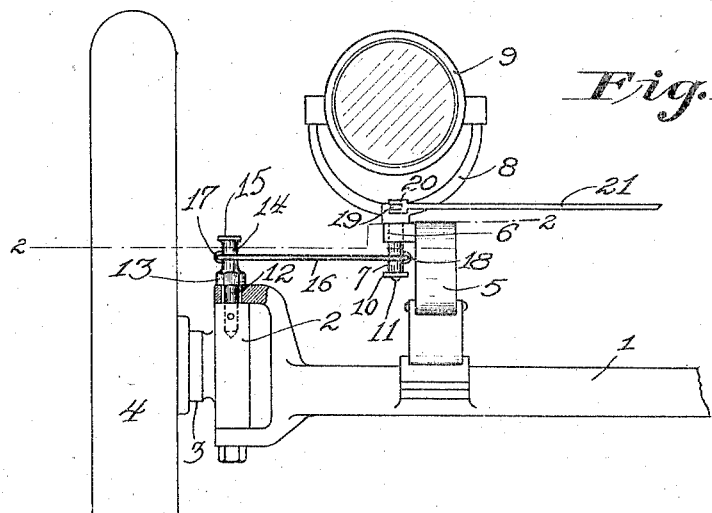
Figure 2:
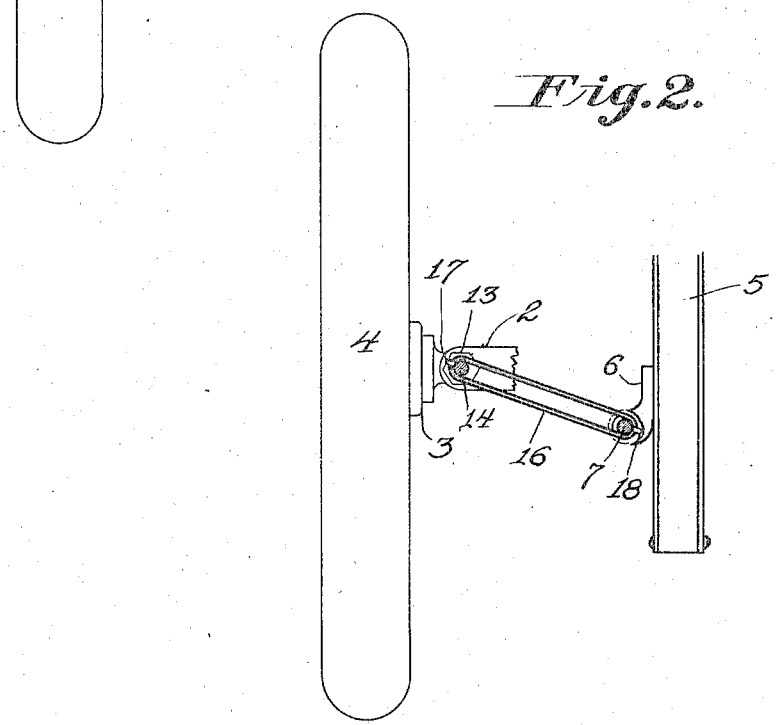

Figure 1 is a view in front elevation of a portion of the front of a running gear for a vehicle showing the headlight operating device carried thereby. Fig. 2 is a horizontal sectional view taken on the line 2—2, Fig. 1.

Referring to said drawings by numerals, 1 designates a front axle of a vehicle which has a knuckle joint connection 2 with a hub 3 of a wheel 4. A spring 5 has been shown supported upon said axle, said spring carrying a lamp bracket 6 through which a vertically arranged shaft 7 projects. Said shaft 7 is rotatable in said bracket and carries the usual lamp fork 8 for the lamp 9. The lower end of said shaft 7 projects beyond the bottom of said lamp bracket, and at its end is provided with a horizontally arranged plate 10 which is connected to said end by means of a screw or bolt 11.

The knuckle joint 2 at its upper end carries a rigid upstanding vertically arranged pin 12 which is provided with a widened flat intermediate bearing surface 13 resting upon said upper end of the knuckle joint, and above said bearing surface, said pin is in the form of a spool 14, the outer end of which is provided with an annular outstanding collar 15. An endless cable 16 is passed around said spool 14 and the shaft 7 of the lamp fork, said cable being held in engagement with said spool and said shaft by the staples 17 and 18.

The fork 8 at its base is provided with an outstanding lip 19 which is engaged by the bifurcated end 20 of a connecting rod 21, the other end of said rod having a similar engagement with a lamp fork on the opposite side of the vehicle.

It will be seen from the foregoing that a turning movement of the steering wheel will simultaneously impart a similar movement to the headlight so that said headlight will project its rays in the direction the vehicle is traveling and as the lamp on the opposite side of the vehicle is connected with the lamp that is operated by said steering wheel, both lamps will rotate simultaneously.

It is preferred to use a cable formed of wire rope as the same is to a certain extent flexible and will slightly yield to the rocking or lurching of the vehicle, so as to prevent damage being done to the operating cable, shaft and spool.

What I claim as my invention is:—

1. A headlight operating device for vehicles comprising a rotatable lamp support, a turning knuckle, a spool carried thereby, and an endless cable fastened to said spool and said lamp support.

2. A headlight operating device comprising a lamp support rotatably mounted on a vehicle, a spool rigid with a knuckle joint of a turning gear, and a cable fastened to said spool and said support.

3. A device of the character described comprising a lamp bracket carried by a vehicle, a lamp support having a shaft rotatable in and projecting through said bracket, a spool rigidly connected with a turning gear of a vehicle, an endless cable connecting said spool and said shaft, and staples for fastening said cable to said spool and shaft.

4. In a device of the character described, the combination with the turning gear of a vehicle provided with a knuckle joint, of a spool projecting above and rigidly connected to said joint, a lamp bracket, a lamp support provided with a shaft projecting through and rotatable in said bracket, a cable connection between said spool and shaft, and fasteners for attaching said cable to said spool and shaft.

In testimony whereof I hereunto affix my signature in presence of two witnesses.

PETER B. DONAHOO.

Witnesses:
 H. C. SCHROEDER,
 ALFRED H. LENT.